May 18, 1937.  J. D. RYDER  2,080,789

MEASURING AND CONTROLLING APPARATUS

Filed June 30, 1933

INVENTOR
John D. Ryder.
BY
Raymond W. Junkins
ATTORNEY

Patented May 18, 1937

2,080,789

UNITED STATES PATENT OFFICE 2,080,789

MEASURING AND CONTROLLING APPARATUS

John D. Ryder, Cleveland, Ohio, assignor to Bailey Meter Company, a corporation of Delaware Application June 30, 1933, Serial No. 678,485

13 Claims. (Cl. 236—70)

This invention relates to the art of measuring and/or controlling the magnitude of a variable quantity, condition, relation, etc., and particularly such variable conditions as temperature, pressure, rate of fluid flow, etc., although the variable may be of any physical, chemical, electrical, hydraulic, thermal or other characteristic.

According to the invention, I produce an electrical effect varying in known proportion to the magnitude of a variable condition whose magnitude or variation I desire to measure and/or control. Such electrical effect may be a small force such as an electromotive force produced by a thermocouple and may be magnified to any desired degree.

The electrical effect representative of the magnitude of a variable is utilized in novel and amplified manner to effect a measuring of the variable and substantially simultaneously is utilized to control an amplified fluid pressure for remotely regulating the variable being measured or another variable whose change in value, due to the regulation, may or may not be effective in changing the value of the variable being measured.

A further object is the provision that a decrease or increase in the value of a condition may be made to effect an electrical or mechanical manifestation of greater or lesser intensity or for a longer or shorter time than for equal increase or decrease in the value of the condition or vice versa. That is, if the magnitude of the variable departs in one direction from predetermined value, the effect produced representative of the value of the variable may be different in duration than that if the variable deviated from predetermined value in the opposite direction.

Still another object is the periodic automatic comparison with a standard, of the apparatus utilized for determining the magnitude of a variable, so that over an extended period of time, a high degree of accuracy is maintained.

A specific object of the invention is the provision of a thermocouple sensitive to temperature, for periodically indicating and/or recording the magnitude of said temperature and substantially simultaneously utilizing the electromotive force generated by the thermocouple representative of temperature as a control of a fluid pressure actuated means for varying the temperature.

Still further objects of the invention will become apparent from the drawing and description relating thereto in connection with a preferred embodiment which I have chosen as representative, and wherein variable temperature in the operation of a heating furnace is measured and substantially simultaneously utilized as a control of the supply of fuel to the furnace.

Figures 1, 2:
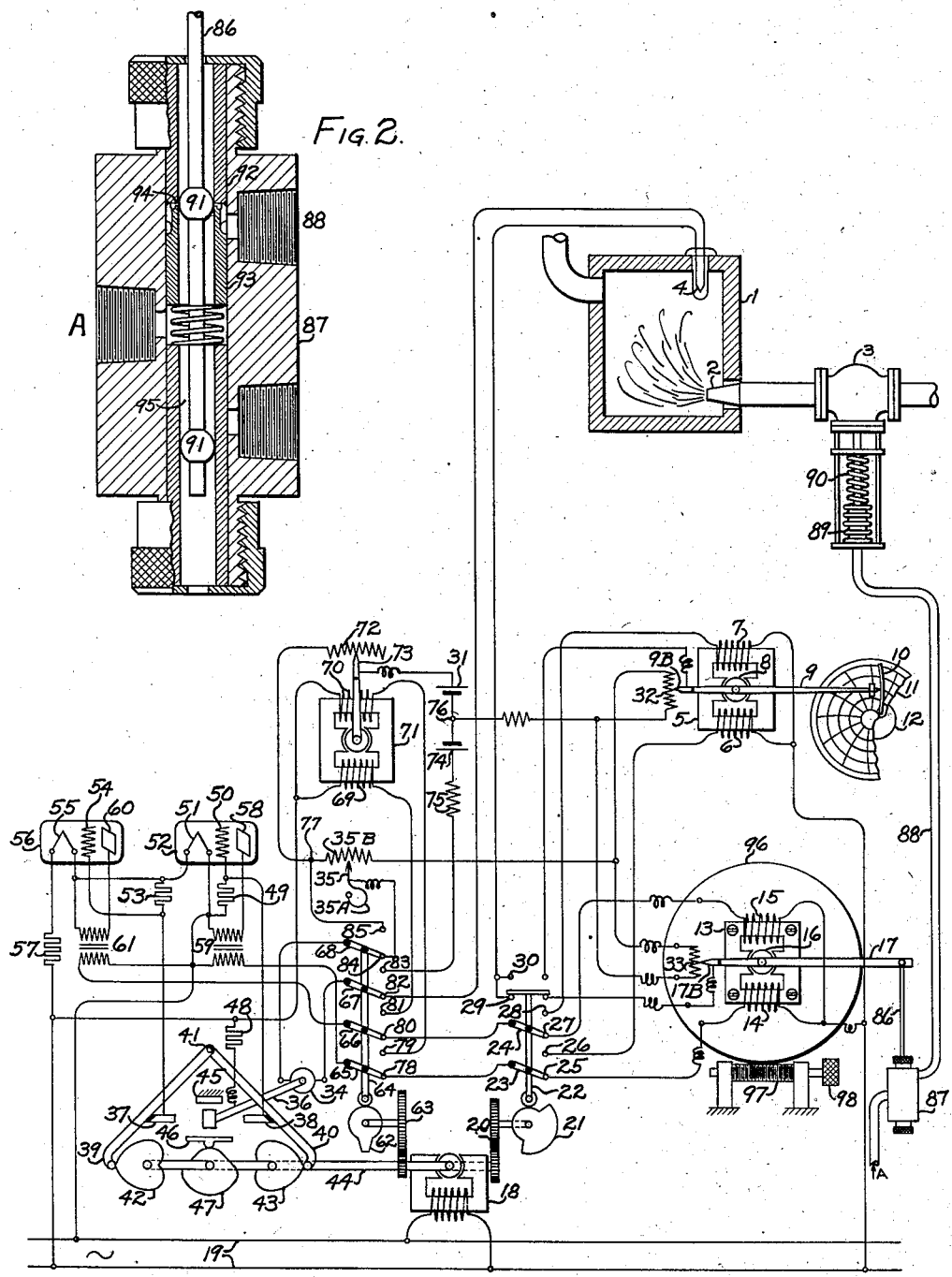
Fig. 1 is a diagrammatic arrangement of apparatus and electric circuit embodying the invention, in connection with the measurement of temperature in a furnace and a control of the supply of fuel to the furnace by fluid pressure means.
Fig. 2 is a sectional elevation to enlarged scale of a pilot valve.

Referring first to Fig. 1, I therein illustrate an embodiment of my invention wherein a temperature in the operation of a heating furnace, such, for example, as a metallurgical heating furnace 1, is measured for instantaneous reading on an index and for recording upon a continuous record chart. Furthermore, from the inter-relation between the value of such temperature and a predetermined temperature desirably to be maintained, I effect a control of the supply of fuel fed to the furnace 1 through a burner 2, by throttling or controlling the throttled position of a valve 3 located in the fuel oil supply line before the burner 2.

I provide a thermocouple 4 located sensitive to temperature within the furnace 1 in known manner. It will be understood that the thermocouple 4 may be located at any point relative to the furnace or the exit products of combustion therefrom, where it is desired to measure the temperature and/or to control the same relative to a predetermined standard. Furthermore, that the fuel supplied to such a furnace need not be oil, and in fact, need not be a fuel burned in suspension, but the control of fuel supplied by a valve 3 is merely representative of any suitable control of supply of fuel to the furnace 1.

Primarily I periodically effect an indicating and recording of the temperature at 4. Alternatively periodically I effect from such temperature, if necessary, a control of the valve 3. Such periodicity may be so frequent that the result is substantially a continuous recording or indication of the temperature and a substantially continuous control of the valve 3.

The use of thermocouples for the measurement of relatively high temperatures is well known in the art, and it is equally well known that the electrical effect obtained thereby is minute and must, of necessity, be amplified mechanically and/or electrically to do useful work, such as recording, indicating and/or controlling. My invention in general contemplates improved electrical circuits and apparatus in combination for causing a substantial amplification of the electrical effect of the thermocouple sensitive to and representative of the temperature within the furnace, and wherein such amplification may be utilized for remotely or locally recording, indicating, and/or to control through fluid pressure actuated means certain variable factors in the operation of the furnace.

I have illustrated the thermocouple 4 as having its hot junction located within the furnace. By the term "hot junction", it is to be understood that I mean that junction of the thermocouple which is exposed to the temperature it is desired to evaluate, regardless of whether that temperature is of a greater or lesser magnitude than the room or reference temperature to which the other junction of the thermocouple circuit is normally exposed, and which I term for simplicity the "cold junction".

The electrical effect obtained through the thermocouple 4, indicative of variations in temperature within the furnace, is utilized in a potentiometer circuit, as will be explained hereinafter for the positioning of a sensitive galvanometer. A mechanically periodically actuated feeling device cooperates with the galvanometer needle for the control, upon departure of temperature from predetermined value, of thermionic or electron discharge devices whereby the minute electrical effect is amplified or magnified for the control of electromagnetic devices, such as motors, which are used as amplified power means for positioning the indicating, recording, and fluid pressure control members.

I show at 5 a motor having opposed field windings 6 and 7 connected in an alternating current circuit and opposedly wound in a manner such that when the windings 6 and 7 are equally energized, the rotor 8 is not urged to rotation in either direction; but when the windings are unequally energized, rotation of the rotor 8 will occur in predetermined direction. Carried by the rotor 8 for angular positioning thereby is an indicator arm 9 adapted to cooperate with an index 10 and comprising a marking means arranged to form a continuous record upon a chart 11, driven at a uniform speed by a clock motor 12. The assembly comprising the motor 5 and indicating-recording means is adapted to advise the value of the temperature to which the thermocouple 4 is sensitive.

Similarly a motor 13, having opposed field windings 14, 15 and a rotor 16 by which is positioned an arm 17, is adapted to effect a control of fluid pressure means for remotely regulating the valve 3. The arrangement is such that the motor 5 is periodically responsive to temperature at the thermocouple 4 and the motor 13 is alternatively periodically responsive thereto.

Upon every change in temperature at the thermocouple 4, I effect an angular displacement of the rotor 8 directly proportional to the variation in the thermocouple potential by substantially de-energizing one or the other of the field windings 6, 7 in a manner to be explained. Similarly and alternately upon change in temperature of the thermocouple 4, a corresponding change in thermocouple potential results in an angular positioning of the rotor 16. It will be observed that the arrangement is such that when temperature at the thermocouple 4 varies, an electromotive force of minute value will be set up in the thermocouple circuit, which, through proper means to be hereinafter described, I amplify for the control of rotation in amount and direction of the motors 5 and 13 alternatively for indicating and recording the temperature at 4, as well as controlling the fuel supply valve 3 from such temperature.

I use in connection with a galvanometer and feeler device, means for periodically and alternately making effective the thermocouple 4 for positioning the motors 5, 13, for periodically and alternately measuring and controlling the temperature. For periodic switching I provide a constant speed alternating-current motor 18 connected directly across the alternating-current source 19, driving through suitable gearing 20 a constantly rotating cam 21 for periodically opening and closing certain circuits. On the drawing I illustrate a switch bar 22 having a roller at its lowermost end and adapted to rise and fall vertically through engagement of the roller with the cam surface upon rotation of the cam. Pivotally fastened to the bar 22 are switch members 23, 24, one end of each of which is pivotally connected to a terminal point while the other end of each is adapted to be moved respectively from contact terminal 25 to 26 and 27 to 28. Further connected to and carried by the bar 22 is a rigid contact bar adapted to close circuit between the contacts 29 or the contacts 30, depending upon whether the bar 22 is in its lowermost or uppermost travel position.

Vertical reciprocation of the bar 22 through periodic rotation of the cam 21 accomplishes a periodic switching whereby the motor 5 is periodically susceptible to conditions indicated by thermocouple 4 and alternately the motor 13 is susceptible to conditions indicated by the thermocouple 4. By this switching arrangement I am able during alternate periods to indicate and record the temperature at the thermocouple 4, and during successive alternate periods, to control from the temperature at the thermocouple 4 the rate of supply of fuel through the burner 2; utilizing the same galvanometer and feeler mechanism.

In the circuit of the thermocouple 4, I utilize the well known zero balance or null method. In accordance with this method, the potential developed by the thermocouple is balanced against the fall of potential through a portion of a slide wire potentiometer or resistance of known length and value per unit of length. Upon a change in potential developed by the thermocouple, a galvanometer in the circuit indicates by its needle swing a departure from balance and produces indirectly a movement on the slide wire potentiometer whereby a balance of potential is effected. The physical position of the contact point on the slide wire potentiometer may be utilized as an indication of temperature, equivalent to the potential across the thermocouple. Such is the system in general which I employ. A constant drop in potential is maintained across the slide wire potentiometer resistance by means of a suitable current source and it is evident that the amount or length of resistance necessary to balance the potential generated by the thermocouple will then be proportional to that potential and may, by suitable calibration, be used to determine its magnitude and correspondingly the magnitude of the temperature to which the thermocouple is susceptible. In Fig. 1 I provide such a potentiometer circuit essentially comprised of a current source battery 31, connected in series with slide wire potentiometers 32, 33, the latter connected in parallel with each other.

As shown in Fig. 1, a galvanometer diagrammatically indicated at 34 is connected in series with the thermocouple 4, and they together span that part of the potentiometer circuit between contact arm 17B and a contact arm 35 of a cold junction compensator later to be described. The contact arm 17B comprises an extension of the arm 17 insulated therefrom and adapted to frictionally engage along the slide wire resistance 33, upon angular positioning of the rotor 16. The contact arm 35 is secured to a bimetallic spiral 35A and adapted to frictionally engage along an auxiliary slide wire resistance 35B. When the difference in potential through that part of the potentiometer circuit between the arms 17B and 35 is equal to that developed by the thermocouple 4, the galvanometer needle 36 will remain stationary midway between the two movable electric contacts 37 and 38 as shown.

Upon a variation in temperature within the furnace, resulting in a corresponding increase or decrease in the potential difference developed by the thermocouple 4, the galvanometer needle 36 would be deflected either to the right or to the left on the drawing an amount substantially proportional to the variation in temperature. Upon such a deflection of the galvanometer needle 36, periodically engagement will be made between the galvanometer needle and either the contact 37 or the contact 38, with the result that rotation of the rotor 16 will be effected in proper direction to move the contact arm 17B along the slide wire resistance 33 until the difference of potential through that part of the potentiometer circuit between the contact arm 17B and 35 is again equal to that developed by the thermocouple; and simultaneously through the control of a fluid pressure, will position the regulating valve 3. It is evident that the amount of movement of the arm 17B will then be proportional to the change in temperature within the furnace and accordingly a true indication of the new temperature will be accomplished by position of the arm 17. Therefrom the supply of fuel to the furnace will be varied in amount and direction whereby the heating of the furnace will be corrected to tend to return the temperature at the thermocouple 4 to predetermined desirable value.

Periodically the switch bar 22 will be reciprocated through the agency of the cam 21 to open-circuit the contacts 29 and close-circuit the contacts 30 whereby the galvanometer controls the motor 5 instead of the motor 13. Simultaneously the switching of the contact arms 23, 24 from contact points 25, 27 to 26, 28, respectively, will connect the circuits to indicate and record the temperature at the thermocouple 4 upon the index 10 and chart 11 through the agency of the motor 5.

With the thermocouple 4 so connected to the galvanometer 34, the potential difference developed by the thermocouple will be compared to the drop in potential through that portion of the potentiometer circuit between, the point of contact of an arm 9B frictionally engaging the slide wire resistance 32, and the arm 35. As described previously, if the potential difference at the thermocouple 4 is equivalent to the difference of potential through that portion of the potentiometer circuit so spanned, the rotor 8 of the motor 5 will remain stationary. If, however, these potential differences are of unequal magnitude, then the rotor 8 will be angularly positioned in the proper direction and amount to urge the indicator arm 9 to new position relative to the index 10 and the chart 11, and simultaneously move the contact arm 9B along the slide wire resistance 32 until equilibrium of potentials is again restored.

I have shown more or less diagrammatically the mechanism through whose agency I am enabled to periodically transmute the mechanical manifestations of the galvanometer needle, of changes in potential generated by the thermocouple connected thereto into electrical manifestations of constant magnitude, but which continue for an increment of time proportional to the mechanical manifestation of the galvanometer needle. This electrical manifestation I then use to control the energization of the motor windings of the motor 5 or the motor 13, depending upon which is then connected to the galvanometer.

Members illustrated as scissors bars 39 and 40, both pivoted at 41, are periodically moved toward and away from each other by the agency of similar but oppositely positioned cams 42, 43, rigidly attached to a shaft 44, rotated at constant speed by the continuously operating motor 18. The scissors bars 39, 40 are provided at their lowermost ends with rollers, the one riding the surface of the cam 42, and the other the surface of the cam 43, and the scissors bars further carry, respectively, the contacts 37, 38 insulated therefrom and from each other.

The galvanometer 34 is of the suspended type and properly located relative to a permanent magnet. Normally the needle 36 of the galvanometer is free to deflect in accordance with the difference of potential generated by the source to which the galvanometer is connected, and that portion of the potentiometer circuit spanned. Periodically, however, the needle 36 is clamped between a stationary portion 45 and a movable bar 46. The movable bar, properly guided, is reciprocated by means of a constantly revolving cam 47 secured to the shaft 44. Thus periodically upon each revolution of the cam 47, the needle 36 will be clamped lightly between the stationary member 45 and the movable reciprocating bar 46, and for a portion of each revolution of the cam 47.

Immediately after the needle 36 has been so clamped, the position of the cams 42, 43 relative to the cam 47 is such that the scissors arms 39, 40 move toward each other. When, as shown, the galvanometer needle 36 is in mid-position, indicating a balance between the two potentials, the scissors arms 39, 40 will follow the complete periphery of the cams 42, 43, and neither of the contacts 37, 38 will engage the needle 36. However, if the needle is deflected through action of the galvanometer 34, either to the right or to the left, then the adjacent scissors arm will follow the periphery of the associated cam until the contact carried by the scissors arm reaches the needle. Further motion of this scissors arm toward the other will then be prevented by the galvanometer needle and the engaged contact will remain in engagement with the needle until the scissors arm is again picked up by the associated cam and moved away. At a predetermined definite point in the outward travel of the scissors arm, the galvanometer needle 36 will be released from clamping engagement and be free to deflect either further away or return toward the predetermined neutral position, and until it is again clamped as the scissors arms travel toward each other on the next cam cycle of revolution.

It is evident that by proper shaping of the cams 42, 43, the length of time the scissors arms are in contact with the needle 36 may be made directly proportional to the amount of deviation of the needle from the mid-position, which in turn is proportional to the difference of the opposed potentials. If desired, one of the cams, for example 42, may be made of a different shape than the other cam, for example 43, whereby the length of contact for a given deflection of the galvanometer needle in one direction may be made different from that for the same amount of deflection of the galvanometer needle in the opposite direction. It is further evident that the cams 42, 43 may be made of any desired shape, so that the length of engagement between the contacts carried by the scissors arms and the galvanometer needle may bear any desired functional relation to the amount of deviation from the neutral or mid-position of the galvanometer needle.

I utilize the feeling and clamping apparatus just described to produce an electrical effect bearing definite relation to the departure of the galvanometer needle from neutral position and for the control of operation of motors 5 and 13. Intermediate between the feeler apparatus and the motors mentioned and controlled by a minute electrical force originated through engagement of the galvanometer needle 36 with either the contact 37 or the contact 38, I interpose electronic discharge devices or thermionic valves for controlling an amplified or substantially greater electrical force to be directly applied to the motors mentioned. Certain features of the motor control circuit, including the electronic discharge devices, are described and claimed in my Patent No. 2,015,967 granted October 1, 1935. I will now explain the functioning of this apparatus in sufficient detail to be understandable in connection with the present application, although it will be understood that the arrangement is illustrated and described in greater detail in the aforementioned patent.

Referring again to Fig. 1, the galvanometer needle 36 is connected directly to one side of the alternating-current source 19, through a suitable resistor 48, and will upon engaging the contact 38, for example, change the normal potential relation maintained by an impedance device shown as the resistance 49, between a grid 50 and a cathode 51 of an electron discharge device herein shown as a thermionic valve 52. Likewise, the galvanometer needle is adapted, upon engagement with the contact 37, to change the normal potential relation maintained by an impedance device shown as a resistance 53 between a grid 54 and a cathode 55 of a thermionic valve 56. The current for heating the cathodes 51, 55, which are connected in series, is provided by the alternating-current source 19 through a resistor 57.

The plate or anode 58 of the device 52 is connected to the cathode 51 through an output circuit which is provided with current from the secondary of a transformer 59. Similarly, the anode 60 of the device 56 is connected to its related cathode 55 through an output circuit supplied with current from the secondary of the transformer 61.

The devices 52, 56 are unidirectional in that current flows from the anodes 58, 60 to the related cathodes 51, 55 and if alternating-current is applied to the devices, then pulsating direct-current or one-half of the alternating-current wave passes through each of the devices when the device is conducting. When, as shown, the galvanometer needle 36 is in engagement with neither the contacts 37, 38, then during a portion of each alternating-current cycle, the plates or anodes of the devices 52, 56 will bear a positive potential with respect to the cathodes and the potential relation between the grids and cathodes will be such as to allow passage of current through the output circuit comprising the secondaries of the transformers. During the alternate half cycle of the alternating-current wave, the potential of the plates of the two devices 52, 56 will be negative with respect to the potential of their respective cathodes, thereby open-circuiting the output circuit of the devices. Thus, a unidirectional half cycle or pulsating direct-current will flow through each of the devices 52, 56 when they are respectively conducting.

If, now, the galvanometer needle deflects either to the right or to the left due to a change in temperature and corresponding change in thermocouple potential, and for a period of time proportional to the change in temperature as hereinbefore described, it will engage either the contact 37 or the contact 38. Under this condition, and for the period of engagement, the normal potential relation between the cathode and grid of the device 52 or the device 56, according as to whether the contact 38 or the contact 37 is engaged, will be changed. During that portion of the alternating-current cycle when the associated device was normally adapted for passage of unidirectional current, the grid will now be sufficiently negative with respect to its cathode that the output circuit of the device will be open-circuited. During the remaining portion of the alternating-current cycle, notwithstanding that the grid will have a positive potential with respect to the potential of the cathode, the device will remain open-circuited inasmuch as the plate will be under a negative potential with respect to the potential of the cathode.

It will therefore be seen that with the galvanometer needle 36 engaging neither of the contacts 37, 38, there will be a unidirectional current flow through the devices 52, 56, and correspondingly through the secondaries of the transformers 59, 61, but with engagement between the needle 36 and either the contact 37 or the contact 38, one or the other of the devices 52, 56 will be open-circuited for the period of such engagement of contacts.

As illustrated in Fig. 1, the field 15 of the motor 13 is connected, through contact point 27 and the switch finger 24 to the primary of transformer 61; while the field 14 is connected through the contact point 25 and the switch finger 23, to the primary of the transformer 59. The other side of the transformers 59, 61 is connected to the power source 19 as is the other side of the fields 14, 15 of the motor 13. Thus, as illustrated, the fields 14, 15 are simultaneously energized through the transformers 59, 61 and the rotor 16, due to the equal opposing torque of the fields 14, 15, is not urged to rotation.

Upon rotation of the cam 21, the switch finger 23 engaging the contact 26, and the switch finger 24 engaging the contact 28, connects the fields 6, 7 of the motor 5 to the transformers 59, 61 in a similar manner. Thus, periodically upon rotation of the cam 21, the motor 13 or the motor 5 is alternately connected to be affected by transformers 59, 61.

As is well known and additionally brought out in my patent referred to, the impedance of the primary of a transformer is dependent upon the current flowing in the secondary winding. Thus, the impedance of the primary of a transformer whose secondary winding is open-circuited is relatively greater compared to a similar transformer whose secondary winding is close-circuited. In my invention, I make use of this principle as, under normal conditions, a pulsating direct-current will pass through the output circuit of the thermionic discharge devices which will be of sufficient value to reduce the impedance of the primary winding of the transformers 59, 61, so that the opposed fields of the connected motors will be energized to a substantially normal amount. Inasmuch as the opposed fields in each motor are energized equally, then due to the characteristics of the motors as previously described, the rotors will not be urged to rotation in either direction.

However, upon rendering one of the devices 52, 56 non-conducting, a corresponding change in impedance of the primary of the related transformer will vary the strength of the connected field winding and the motor will be allowed to rotate in one direction or the other.

Upon variation in temperature, as indicated by a change in thermocouple potential and corresponding movement of the galvanometer needle, for an increment of time proportional to the change in temperature a circuit will be closed, changing the normal potential relation between the grid and cathode of one of the electronic discharge devices and thereby open-circuiting the output circuit of that device. The impedance of the primary of the transformer having its secondary connected in that output circuit will then be increased to such a value as to substantially de-energize the field of the related motor, and inasmuch as the other field of the respective motor will be normally energized, rotation of the motor in desired direction will ensue.

It will, of course, be evident that if the galvanometer needle 36 departs from neutral position in one direction, it will engage the contact 37 through a portion of the cycle of the cam 47, whereby for a portion of each period the discharge device 56 will be rendered non-conducting and the field 15 of the motor 13 be correspondingly weakened relative to the field 14. When this occurs, the rotor 16 will be angularly positioned in desired direction so that the arm 17 will move to a new position representative of the value of the new temperature and through means to be later described, will actuate the valve 3 for control of fuel supplied to the furnace. Should the galvanometer needle 36 be deflected in the opposite direction, then its engagement with the contact 38 will effect an opening circuit of the discharge device 52 and with corresponding change in the impedance of the primary of the transformer 59, the field 14 will be weakened whereby the rotor 16 will be caused to rotate in the opposite direction.

Upon periodic rotation of the cam 21, the temperature at the thermocouple 4 will be recorded upon the chart 11, and indicated upon the index 10 through the agency of the same galvanometer, feeler mechanism, and thermionic discharge devices.

Such positioning of the rotors 16, 8 will, as hereinbefore explained, move the related contact arms 17B, 9B along the slide wire potentiometers 33, 32, respectively, thereby balancing the relation of potentials wherein when such balance is reached, the galvanometer needle 36 will have returned to its neutral position wherein, upon reciprocation of the cams 42, 43, 47, no engagement of the needle 36 with the contacts 37, 38 will occur and no further change in the indication, record or control will take place until the next deviation of temperature.

The means I have devised for compensating for variations in cold junction temperature is of a simple construction and does not in any way impair the accuracy of the potentiometer method of measuring potentials. In accordance with my improved method, I automatically add to or subtract from the potentiometer potential against which is balanced the thermocouple potential, an amount equal to the change in the thermocouple potential due to a variation in the temperature of the cold junction. I show the contact arm 35 carried by a bimetallic spiral 35A and adapted to engage a slide wire resistance 35B connected in the potentiometer circuit. Upon a variation in the temperature of the cold junction of the thermocouple to which temperature the bimetallic spiral is exposed, the contact tip 35 will be moved along the resistance 35B to vary the potentiometer potential impressed on the thermocouple. For example, assume the temperature of the hot junction of the thermocouple 4 to remain constant, then upon an increase in temperature of the cold junction thereby reducing the thermocouple potential, the bimetallic spiral will move the contact arm 35 along the resistance 35B until the difference in potential between the point on the slide wire resistance 35B, previously engaged by the contact arm 35, and the point on the resistance 35B now engaged by the contact arm, is equal to the drop in potential generated by the thermocouple due to the rise in cold junction temperature. Regardless, then, of changes in cold junction temperature, the galvanometer needle will remain in the mid-position unless there is a change in the hot junction temperature and the indicator arms 9, 17 will be positioned only in response to changes in the hot junction temperature of the thermocouple 4.

The accuracy of a potentiometer may be materially affected upon change in the potential drop across the resistance. It is desirable, then, to periodically standardize or compare the potential drop across the slide wire resistance with a standard drop or a differential of potential of known value. In this connection I provide a constantly rotated cam 62, driven at proper speed through the gearing 63, from the shaft 44. The gear ratio may be such that the cam 63 makes one revolution to several revolutions of the cams 21, 42, 43, 47. In fact, the cam 62 may be arranged to make only one revolution per day, or at any interval desired.

In engagement with the cam surface 62 is one end of a switch bar 64, pivotally fastened to which are contact fingers 65, 66, 67, 68, each pivoted separately externally relative to the switch bar 64 in a manner such that reciprocation of the bar 64 through rotation of the cam 62 will cause a vertical reciprocation of one end of each of the contact fingers. Such reciprocation will cause that end of each contact finger to move from one contact to another so that alternately certain circuits are close-circuited, and at alternate intervals other circuits are close-circuited.

I illustrate the switch member 64 in its lowermost travel position wherein the contact finger 65 connects the primary of the transformer 59 with contact finger 23; contact finger 66 connects the primary of the transformer 61 with contact finger 24; contact finger 67 connects one side of the galvanometer 34 with the thermocouple 4; and contact finger 68 connects the other side of the galvanometer 34 with the contact arm 35.

Upon rotation of the cam 62 to a position 180° from that shown in Fig. 1, the just mentioned circuits are open-circuited and the primaries of the transformers 59, 61 are connected directly respectively to field windings 69, 70 of a motor 71, while the galvanometer is connected at one terminal with a variable resistance 72 and at the other terminal with the contact finger 73 of the resistance 72, through a power source 74 and battery 31.

Once during each revolution of the cam 62, the galvanometer is disconnected from the thermocouple as well as from the cold junction compensator, and is connected directly across the resistance 72 and power sources 31, 74. Its operation connects the galvanometer through a suitable resistance 75 to the standardization cell 74 and to the potentiometer circuit by-passing the resistance 35B. The potential of the potentiometer circuit between the junction point 76 and 77 is that impressed on the galvanometer in opposition to the potential of the standard cell 74.

Unless the potentials so impressed on the galvanometer are of equal magnitude, indicating a definite predetermined difference of potential between the junctions 76, 77, the galvanometer will deflect in direction and amount dependent upon the preponderance of one potential over the other, and therewith, in a manner as described with reference to the operation of the motors 5, 13, the motor 71 will be periodically operated for increments of time proportional to the amount of deflection of the galvanometer needle to vary the amount of resistance 72 in the potentiometer circuit until the desired difference in potential exists between the junctions 76, 77, when the potentials impressed on the galvanometer will be of equal magnitude and the galvanometer needle will be in the mid-position.

Usually the differential in potential existing between the junctions 76, 77 can be brought to the desired value during one cycle of operation of the scissors arms 39, 40, as I prefer to make the comparison frequently enough to eliminate all but very minute changes in the difference of potential desirably maintained across the slide wire resistance. However, it is apparent that by changing the length of the raised portion of the cam 62, I may maintain the switch members in engagement with the contacts 79, 81, 83 and 85 for any desired number of cycles of operation of the scissors arms 39, 40.

I will now explain the control, by fluid pressure means, of the regulating valve 3, from a positioning of the arm 17 by the rotor 16. From the arm 17 is pivotally suspended a link 86 comprising a pilot moved vertically relative to a pilot casing 87 for control of air under pressure admitted to the casing 87 from a source of supply A. The novel features of the pilot valve assembly provide a fluid pressure to control the valve 3, dependent upon the axial positioning of the pilot stem 86 and in turn upon the positioning of the arm 17.

Air under pressure admitted to the casing 87 from the source A leaves the casing 87, through a pipe 88, to a metallic bellows 89, spring opposed, for positioning valve 3. The throttle position of the valve 3 in the fuel supply line is, then, proportionate to the pressure effective within the bellows 89 and, in turn, to the pressure supplied at the outlet of the pilot 87.

I show at Fig. 2 the arrangement and construction of the pilot valve assembly in section and to enlarged scale.

As is common in this art, the pilot comprises a stem 86 having enlargements 91 known as lands, positioned axially in the pilot casing 87 relative to ports for controlling the passage of air or other desirable pressure fluid. Air under pressure is admitted to the interior of the pilot casing 87 from a point of supply A, and the positioning therein of the pilot 86 controls air pressure in the discharge pipe 88. Within the casing 87 are sleeves 92, 93 recessed slightly at their joining point 94 to provide a thin annular port adjacent the upper of the two lands 91, and which port communicates by proper passages with the outlet pipe 88.

In construction I preferably make the casing 87 of brass, the sleeve sections 92, 93 of monel, and the land 91 of Enduro KA₂, or similar material. In clearance between the land or ball 91 and the interior of the sleeve sections, I allow something in the nature of .0005 inch. The total axial movement of a pilot such as 86 may be in the nature of thousandths or hundredths of an inch.

The land 91 is shown as spherical, although it may be formed of any desired contour such as conical or slow tapered. This pilot has a number of features which distinguishes it clearly from those pilot valves now known in the art which are generally of a type controlling the quantity of fluid through the related ports and are usually of a type which must be returned, either through movement of the pilot stem or of the pilot sleeve, to a shutoff position, in order that the functioning of the device as a whole will be accomplished in desired manner. The present pilot is in the nature of a positioning device giving a definite loading pressure at the port 94 and the outlet pipe 88 for each axial position of the pilot stem 86, rather than a quantity control of flow through the port.

Due to the slight amount of clearance between the greatest diameter of the land 91 and the interior of the sleeve portion, there will be a constant leakage or bleed of air from the supply A around the land and to the atmosphere, through the ends of the assembly 87. With the supply of air admitted between the two lands 91 (Fig. 2), there will be a constant bleed or leakage past each land, and thus an entirely balanced condition of pressure relative to the pilot stem 86 wherein no end thrust is produced in either direction. Furthermore, it is a well known principle that a spherical, cylindrical, conical, or similar shape of object, pivoted or held for free movement in a column of flowing fluid, will tend to center itself in the column. Thus, the lands 91 tend to center themselves within the interior of the sleeve portion, allowing substantially uniform leakage at all points of the periphery of the land and providing against possible friction and axial movement of the stem 86, for the fluid bled past the land serves in the nature of lubrication thereof which, in addition to the fact that the lands are substantially centered and not touching the walls of the sleeve, prevents friction during axial movement. In reality, the valve member 86 does not touch the sleeve at any point, and therefore is practically frictionless, as well as being, to a certain extent, lubricated by the air bleeding past it at all points in the periphery. Moreover, even though the member should not be properly aligned with respect to the sleeve and was not substantially centered in the column of bleed air, there would actually be nothing but a line contact at the greatest diameter of the land so that the friction would be extremely slight.

With a constant bleed of air past the land 91 to the atmosphere and full supply pressure at the interior of the sleeve between the lands, there will be a definite gradation of pressure from the space 95 interior of the sleeves and surrounding the stem 86 to the point of least clearance between the lands 91 and the sleeves, namely, the point of greatest diameter of the lands 91.

Surrounding the upper land in the shown position is the narrow outlet or discharge port 94 which may be only a few thousandths of an inch in a diameter axial of the assembly. A definite air pressure will exist in the port 94, depending upon the axial positioning of the adjacent land 91 and for every point of such positioning (upward in Fig. 2) until full pressure of the space 95 is effective at 88.

The arrangement is further characterized by the annular port 94 which is employed. Due to the principle of operation that a pressure is picked off along the lands 91, the port 94 must be a very small size relative to the land. By having an annular port as shown, the width of the port may be decreased to a very few thousandths of an inch, while the total area for effectiveness of pressure is such width multiplied by the circumference at the point adjacent the land, or a substantial area opening. The annular port of this type has the further advantage in that there is no pressure reaction tending to throw the valve member to one side or the other of the sleeve.

All of these features of the arrangement combine to provide a pilot valve capable of being positioned within the casing with a minimum of effort, as it has substantially a lubricated non-frictional movement with a minimum of end thrust. The control of pressure fluid by the pilot is in the nature of supplying to the port and part under control, a pressure accurately depending upon the axial positioning of the pilot within its casing and wherein such pressure-position relation may be definitely controlled by the shaping of the land 91. For example, the land 91 does not need to be spherical in shape, but may be of a truncated conical section. It may be said that by providing a constant bleed or leakage past the land 91 there is always a pressure gradient along the surface of the land from its maximum to its minimum diameter. Such pressure gradient will be between the pressure of the atmosphere and the pressure of supply in the space 95. If, then, the pilot is moved axially relative to the port 94, then the port 94, of very thin annular dimension, will be opposite some point of the pressure gradient, dependent upon the amount of axial movement of the pilot. This may be readily seen if we assume that a pressure of air at 50 lb. exists in the space 95 and the land 91 has its greatest diameter opposite the port 94. There will be atmospheric pressure upward on the drawing (Fig. 2) from the land 91, while between the point of greatest diameter of the land and the space 95 there will be a pressure gradient of from atmospheric to 50 lb. gage. If now the pilot is moved upwardly a certain distance between the shown position and point where the land 91 merges into the stem 86, then there will be available at the port 94 a pressure of some value between atmospheric and 50 lb. In other words, for every upward movement of the land 91 relative to the port 94, there will be available at the port 94 a pressure of some value between atmospheric and 50 pounds, and by vertical positioning of the pilot we can apply to the outlet pipe 88 a pressure directly related to such vertical positioning, correspondingly related to the positioning of the arm 17 by the rotor 16 and to the temperature at the thermocouple 4. Inasmuch as pressure available in the pipe 84 directly predicts the positioning of the bellows 89 opposed by the spring 90 and correspondingly the throttled position of the valve 3, we then have a positioning of the valve 3 directly related to the temperature of the thermocouple 4, and movement of the valve 3 proportional to variation in such temperature.

In operation, if the temperature at the thermocouple 4 is as desired, it will be maintained there through a supply of fuel for combustion controlled by the throttled position of the valve 3, of a certain opening. If for some reason the temperature varies from the predetermined desirable value, then the amount of such variation, represented by a potential change in the potentiometer circuit, causes, as previously explained, a positioning of the motor 13 in one direction or the other until movement of the contact arm 17B relative to the slide wire resistance 33, rebalances the circuit. Such movement causes a corresponding change in the position of the arm 17, the pilot 86, the pressure in the pipe 88, and the throttled position of the valve 3, to vary the supply of fuel in a direction to return the temperature at the thermocouple 4 to predetermined value.

In order that I may vary the predetermined desirable temperature to be maintained at the thermocouple 4, I arrange adjustable means for moving the motor 13 and slide wire resistance 33, as a whole, relative to a fixed point and relative to the pilot casing 87. I provide that the motor 13 and the slide wire resistance 33 be mounted upon a base 96 in a manner pivoted substantially around the center of the rotor 16, and capable of rotation around such center through the agency of a screw 97 by means of a knob 98. I may desirably calibrate the base 96 relative to the screw 97, so that I can move the same to an indicated desirable temperature to be maintained at the thermocouple 4, and vary such predetermined temperature as desired through turning the knob 98.

While I have illustrated the invention as relating particularly to the measurement of temperature and the use of thermocouples, still I contemplate that the arrangement may be utilized for the measurement and control of other variables or characteristics in the operation of apparatus and which may be of physical, chemical, thermal, electrical or other nature. Such variables may be flow, temperature, pressure, or ratio of variables, etc.

While in the description and appended claims for the sake of simplicity and clearness I have used the terms "slide wire resistance" and "slide wire potentiometer", it is to be understood that I include in this term any variable resistance capable of performing the same function.

So far as the feeler and amplifying mechanism is concerned, it is not necessary that the movable portion illustrated as the galvanometer needle 36 be the movable portion of a galvanometer, but such movable part might be positioned by a Bourdon tube sensitive to pressure or temperature, or by the indicator arm of a fluid flow meter, or by any similar device having a relatively small available power which is desirably amplified for recording, indicating and/or control therefrom, and wherein electrical effects may be produced in amplified form, of constant magnitude, but of duration or for a percentage of the period of operation dependent upon the amount of departure of the variable from a predetermined value.

While I have illustrated the control by the motor 13 of a fluid pressure, such as air, I may equally as well use water, oil, or any other of the well known pressure fluids.

While I have illustrated and described certain preferred embodiments of my invention, it is to be understood that I am not to be limited thereby except as to the claims in view of prior art.

What I claim as new, and desire to secure by Letters Patent of the United States, is:—

1. The combination with a heating device of means responsive to the temperature thereof, a pair of electron discharge devices having input and output circuits, said means adapted to control said input circuits, recording means controlled by the current in said output circuits and for advising the temperature, and fluid pressure actuated control means for said heating device and controlled by the current in the output circuits, said recording means and control means operated periodically alternately.

2. In combination with means for producing an electrical potential representative of the magnitude of a variable, a plurality of electron discharge devices each having an input and an output circuit, means adapted to control the energization of said input circuits, indicating means of the value of the variable controlled by the current of said output circuits, and fluid pressure actuated means controlled by the current in said output circuits for regulating the rate of application of an agent to vary the magnitude of said variable, said indicating means and fluid pressure actuated means operated periodically alternately.

3. The combination with a heating apparatus, of means responsive to a temperature therein, an electron discharge device having an input and an output circuit, said means adapted to control said input circuit, indicating means controlled by the current in said output circuit for advising the temperature, and fluid pressure actuated control means for said heating apparatus and controlled by the current in the output circuit, said indicating means and control means operated periodically alternately.

4. In combination, a heating device provided with fuel supply means, means for producing a potential representative of a temperature of said device, a potentiometer, an indicating mechanism, fluid pressure actuated means for controlling the rate of fuel supply to said device, and means for periodically during successive increments of time bringing said indicating mechanism and during alternate periods of time said control means under the joint control of said potentiometer and said second-named means.

5. The combination with a furnace, of control means for varying the heating thereof, means sensitive to a temperature of the furnace, an indicator of such temperature, and an electron discharge device controlled by said temperature sensitive means for operating the control means and the indicator periodically alternately.

6. The combination with a furnace, of control means for varying the heating thereof, means sensitive to a temperature of the furnace, an indicator of such temperature, and a plurality of electron discharge devices controlled by said temperature sensitive means for operating the control means and the indicator periodically alternately.

7. The combination with a furnace, of regulating means for varying the heating thereof, means sensitive to a temperature of the furnace, an indicator of such temperature, and means controlled by said temperature sensitive means for operating the regulating means and the indicator periodically alternately.

8. In combination, regulating means for varying the magnitude of a variable, means sensitive to the variable, an indicator of the variable, and means controlled by said last named means for operating the regulating means and the indicator periodically alternately.

9. A control device, comprising in combination, a variable resistance, a cooperating member movable relative to said resistance, a rotatable base for supporting said resistance and member, and a pilot valve having a movable valve member connected to said cooperating member.

10. A control device, comprising in combination, a slide-wire resistance, a contact arm movable along said slide-wire resistance, reversible means for positioning said arm, a base for supporting said slide-wire resistance and said reversible means, a pilot valve having a movable valve member connected to said contact arm, and means for moving said base relative to said pilot valve.

11. In a control system for regulating the application of an agent to produce or maintain a variable, in combination, a potentiometer comprising a resistance, a contact movable along said resistance, reversible means for positioning said contact in accordance with the magnitude of the variable, a pilot valve positioned by the reversible means for producing a fluid pressure in accordance with the position of said contact, control means for the agent actuated by said fluid pressure, a movable support for said potentiometer and said reversible means, and means for moving said support relative to said pilot.

12. In combination, control means for a variable, indicating means of the variable, a potentiometer comprising a slide wire resistance associated with each of the first named means, means for producing a potential representative of the magnitude of the variable, and means under the joint control of said last named means and each of said potentiometers successively for operating the control means and the indicating means periodically alternately.

13. In combination, fluid pressure actuated control means for a variable, indicating means of the variable, a potentiometer comprising a slide wire resistance associated with each of the first named means, means for producing a potential representative of the magnitude of the variable, and means under the joint control of said last named means and each of said potentiometers successively for operating the control means and the indicating means periodically alternately.

JOHN D. RYDER.